United States Patent
Griffiths et al.

(10) Patent No.: US 9,732,802 B2
(45) Date of Patent: Aug. 15, 2017

(54) METALLIC INSERT WITH SMOOTH CONTOURS FOR USE WITH COMPOSITE WORKING MEMBERS

(71) Applicant: GM Global Technology Operations LLC, Detroit, MI (US)

(72) Inventors: Leonard Barry Griffiths, Fenton, MI (US); Deividas R. Alksninis, Dearborn Heights, MI (US); Baisong Feng, Rochester Hills, MI (US); Michael A. Karram, Flint, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/989,277

(22) Filed: Jan. 6, 2016

(65) Prior Publication Data

US 2016/0230813 A1    Aug. 11, 2016

Related U.S. Application Data

(60) Provisional application No. 62/112,681, filed on Feb. 6, 2015.

(51) Int. Cl.
*F16D 1/06* (2006.01)
*F04D 29/28* (2006.01)
(Continued)

(52) U.S. Cl.
CPC ............... *F16D 1/06* (2013.01); *F01C 21/08* (2013.01); *F01C 21/0809* (2013.01); *F04C 2/084* (2013.01); *F04D 25/08* (2013.01); *F04D 29/263* (2013.01); *F04D 29/281* (2013.01); *F05C 2225/00* (2013.01); *F05C 2253/22* (2013.01);
(Continued)

(58) Field of Classification Search
CPC ...... F01C 21/08; F01C 21/0809; F04C 2/084; F04D 25/08; F04D 29/263; F04D 29/281; F05C 2225/00; F05C 2253/22; F16D 1/06; F16D 2001/062; F16D 2001/102; F16D 2200/0004; Y10T 403/21; Y10T 403/3933; Y10T 403/46; Y10T 403/4637; Y10T 403/4694; Y10T 403/57; Y10T 403/7039; Y10T 403/7047
USPC ......... 403/28, 192, 230, 243, 263, 300, 361, 403/365; 464/182
See application file for complete search history.

(56) References Cited

U.S. PATENT DOCUMENTS

| 3,477,794 A | * | 11/1969 | Abbott | B63H 23/34 123/146.5 A |
| 4,566,855 A | * | 1/1986 | Costabile | B63H 1/20 416/134 R |

(Continued)

FOREIGN PATENT DOCUMENTS

WO    WO 9605101 A1 *  2/1996  ............... F16D 1/06

*Primary Examiner* — Josh Skroupa
(74) *Attorney, Agent, or Firm* — Harness, Dickey & Pierce, P.L.C.

(57) ABSTRACT

A rotary working component for use in a pump, compressor, blower or the like having an impeller, rotor, fan blade or other similar component includes a metallic insert and a composite structure overmolded on the metallic insert. The metallic insert can include an aperture adapted to mount the rotary working component to a drive shaft and a fluted catenoid or truncated spherical or spheroid outer surface having smooth contours between fluted regions thereof.

4 Claims, 1 Drawing Sheet

(51) Int. Cl.
*F01C 21/08* (2006.01)
*F04C 2/08* (2006.01)
*F04D 25/08* (2006.01)
*F04D 29/26* (2006.01)
*F16D 1/10* (2006.01)

(52) U.S. Cl.
CPC .. *F16D 2001/062* (2013.01); *F16D 2001/102* (2013.01); *F16D 2200/0004* (2013.01); *Y10T 403/4637* (2015.01); *Y10T 403/7039* (2015.01)

(56) References Cited

U.S. PATENT DOCUMENTS

| | | | | |
|---|---|---|---|---|
| 4,842,483 | A * | 6/1989 | Geary | B63H 23/34 416/2 |
| 7,182,578 | B2 * | 2/2007 | Chou | F16D 1/06 403/192 |
| 2014/0037370 | A1 * | 2/2014 | Lei | F16B 7/18 403/300 |

* cited by examiner

METALLIC INSERT WITH SMOOTH CONTOURS FOR USE WITH COMPOSITE WORKING MEMBERS

CROSS-REFERENCE TO RELATED APPLICATIONS

This application claims the benefit of U.S. Provisional Application No. 62/112,681, filed on Feb. 6, 2015. The entire disclosure of the above application is incorporated herein by reference.

FIELD

The present disclosure relates to a metallic insert for use with a rotary working component of a pump, compressor, blower or the like.

BACKGROUND AND SUMMARY

This section provides background information related to the present disclosure which is not necessarily prior art.

Many industrial and automotive components are being made from composite materials in order to reduce weight and reduce material costs as compared to metal components. In addition, the use of composite materials can result in improved molding geometries that result in improved performance such as higher efficiency and quieter operation. Problems exist when using composite materials as rotary working components in a fluid moving device or motor. In particular, composite rotary working components such as impellers, rotors, fan blades, gerotors and other rotary working components of pumps compressors, blowers, fans, and motors can include a metallic insert for fastening purposes. In a particular example, a composite impeller is over-molded on a metallic insert that fastens the impeller to a drive shaft. Failures have occurred due to cracks in the composite material.

The present disclosure provides a metallic insert having smooth contours to provide a mechanical lock in the radial and axial directions so that the composite material of the rotary working component stays in place and the metal insert transmits drive to the composite portion of the rotary working component. The smooth contours of the metallic insert reduce stress concentrations in the composite part when the composite part is mechanically or thermally loaded. The composite part and metallic insert have different coefficients of thermal expansion, which can generate thermal stress on heating/cooling.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
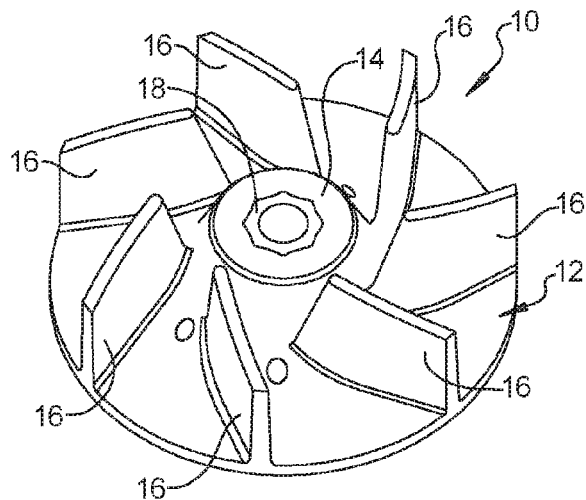
FIG. 1 is a perspective view of an exemplary impeller having a composite portion defining a series of blades and a metallic insert according to the principles of the present disclosure.
Figure 2:
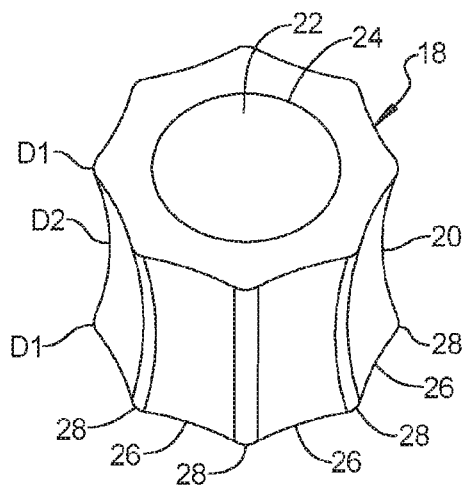
FIG. 2 is a perspective view of a metallic insert according to the principles of the present disclosure.
Figure 3:
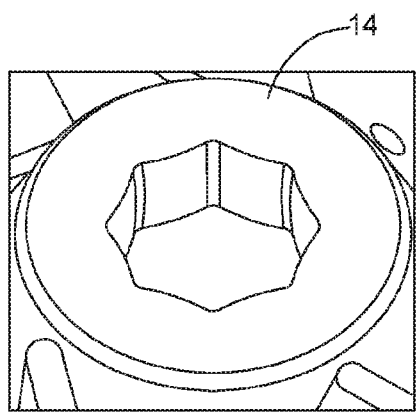
FIG. 3 is a perspective view of the composite portion of the exemplary impeller with the metallic insert removed for illustrative purposes.

With reference to FIG. 1, an exemplary rotary working component 10 in the form of an impeller is shown including a composite portion 12 defining a hub 14 and a series of blades 16 that are over-molded on a metal insert 18 according to the principles of the present disclosure. The composite portion 12 can be formed from commonly used engineering plastics or other material having various known compositions.

The metal insert 18 can include a fluted, generally catenoid outer surface 20 and an aperture 22 defining an inner surface 24. The inner surface 24 can be press-fit on a drive shaft (not shown) or can optionally include splines or a key for rotationally fixing the rotary working component 10 on a drive shaft. The fluted catenoid outer surface 20 generally includes a larger outer diameter D1 at opposite ends of the metal insert 18 and smoothly transitions to a relatively smaller outer diameter D2 at an intermediate portion between the opposite ends. The catenoid outer surface 20 includes fluted or recessed regions 26 having smooth contours 28 transitioning between the fluted regions 26. The numbers and depths of the fluted regions 26 can be selected based upon a specific application. The catenoid outer surface 20 of the metal insert provides a mechanical lock in the axial direction while the fluted regions 26 provide a mechanical lock in the radial direction so that the metal insert 18 transmits drive to the composite rotary working member. The smooth contours of the fluted catenoid outer surface 20 of the metal insert 18 reduce stress concentrations in the composite part when the composite part 10 is mechanically and thermally loaded.

Figure 4:
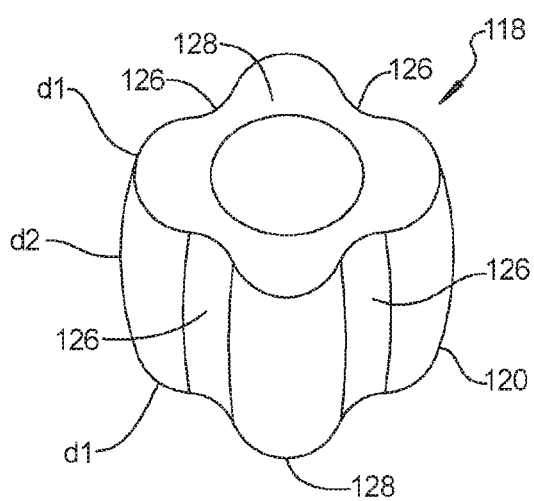
FIG. 4 is a perspective view of an alternative metallic insert having an outer surface in a shape of a truncated fluted spheroid.

As an alternative, as shown in FIG. 4, the metal insert 118 can be provided with a truncated spherical or generally spheroid surface 120 having recessed flute regions 126. The truncated spherical or spheroid outer surface 120 generally includes a smaller outer diameter d1 at opposite ends of the metal insert 118 and smoothly transitions to a relatively larger outer diameter d2 at an intermediate portion between the opposite ends. The spherical or spheroid outer surface 120 of the metal insert 118 provides a mechanical lock in the axial direction while the fluted regions 126 provide a mechanical lock in the radial direction so that the metal insert 118 transmits drive to the composite rotary working member. The number and depth of the fluted regions 126 can be varied depending upon a desired application. The smooth contours of the spherical or spheroid outer surface 120 of the metal insert 118 reduce stress concentrations in the composite part when the composite part 10 is mechanically and thermally loaded. By "truncated" it is meant that the spherical or spheroid surface 120 is provided with flattened or generally flattened end surfaces 128.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rotary working component, comprising:
   a metallic insert and a composite structure overmolded on said metallic insert, said metallic insert including an aperture adapted to mount the rotary working component to a drive shaft and a fluted catenoid outer surface having smooth contours between fluted regions thereof, wherein the composite structure is overmolded on the fluted catenoid outer surface.

2. The rotary working component according to claim 1, wherein the rotary working component is one of an impeller, a rotor, a fan blade, and a gerotor.

3. A rotary working component, comprising:
   a metallic insert and a composite structure overmolded on said metallic insert, said metallic insert including an aperture adapted to mount the rotary working component to a drive shaft and a fluted truncated spherical or spheroid outer surface having smooth contours between fluted regions thereof, wherein the composite structure is overmolded on the fluted truncated spherical or spheroid outer surface.

4. The rotary working component according to claim 3, wherein the rotary working component is one of an impeller, a rotor, a fan blade, and a gerotor.

* * * * *